United States Patent
Bruckmann et al.

[11] Patent Number: 5,922,194
[45] Date of Patent: Jul. 13, 1999

[54] FILTER CHANGING DEVICE FOR PLASTICS PROCESSING PLANTS

[75] Inventors: Theodor Bruckmann, Xanten; Ralf Simon, Munster, both of Germany

[73] Assignee: Firma Kreyenborg Verwaltungen und Beteilgungen GmbH & Co. KG, Munster, Germany

[21] Appl. No.: 08/981,075

[22] PCT Filed: May 8, 1996

[86] PCT No.: PCT/DE96/00846

§ 371 Date: Nov. 25, 1997

§ 102(e) Date: Nov. 25, 1997

[87] PCT Pub. No.: WO96/38286

PCT Pub. Date: Dec. 5, 1996

[30] Foreign Application Priority Data

May 13, 1995 [DE] Germany .................... 195 19 907

[51] Int. Cl.⁶ .................................................. B01D 29/96
[52] U.S. Cl. ........................... 210/90; 210/232; 210/236; 210/333.01; 210/445; 210/108; 425/197; 425/199
[58] Field of Search .................................. 210/741, 790, 210/791, 90, 108, 232, 236, 330, 333.01, 359, 445; 425/185, 197, 199

[56] References Cited

U.S. PATENT DOCUMENTS

| | | |
|---|---|---|
| 4,814,186 | 3/1989 | Trott . |
| 4,849,113 | 7/1989 | Hills . |
| 5,032,267 | 7/1991 | Petschner . |
| 5,362,223 | 11/1994 | Gneuss . |
| 5,417,866 | 5/1995 | Trott . |
| 5,449,465 | 9/1995 | Degan . |
| 5,498,334 | 3/1996 | Gneuss . |

FOREIGN PATENT DOCUMENTS

| | | |
|---|---|---|
| 395 825 | 3/1991 | Austria . |
| 0 707 878 | 4/1996 | European Pat. Off. . |
| 3905963 | 2/1989 | Germany . |
| 41 16 199 | 5/1991 | Germany . |
| WO 92/16351 | 10/1992 | WIPO . |

*Primary Examiner*—Jay H. Woo
*Assistant Examiner*—Fred Prince
*Attorney, Agent, or Firm*—Merchant, Gould, Smith, Edell, Welter & Schmidt

[57] ABSTRACT

In a filter changing device with a flow path for the plastic in which one of two or more filters can be inserted into the flow path as desired, the invention proposes to fit the filter support in such a way that it can assume a working back rinse and filter change position, in which, in the back rinse position, the plastic is caused to reverse its direction of flow through two interconnected flow channels without permitting air to penetrate into the filter changing device and in which there is free access to one of the filters in the filter changing positions. As the back rinse position can succeed a filter changing position, it is possible to clear the whole filter changing device of occluded air before a plastic processing plant starts production.

7 Claims, 1 Drawing Sheet

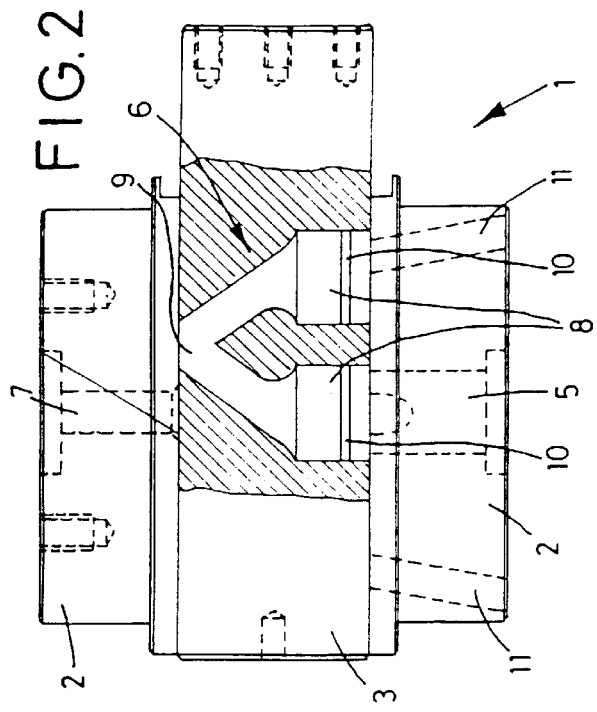
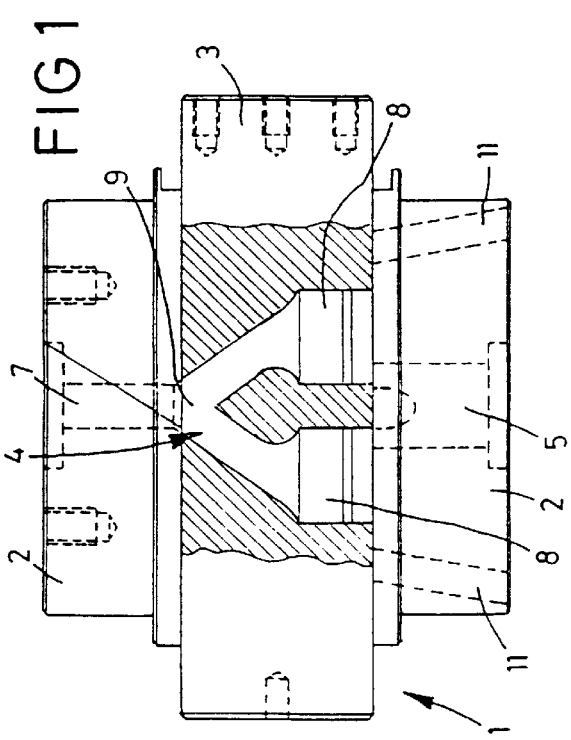
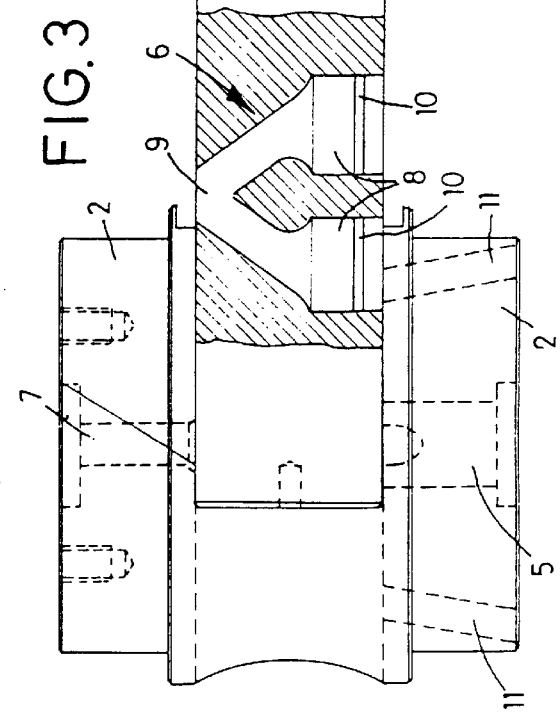

FILTER CHANGING DEVICE FOR PLASTICS PROCESSING PLANTS

The invention relates to a screen-changing device according to the precharacterizing clause of claim 1.

Practical use of such a device is known from DE 39 05 963 A1. While in the following text reference is made generally to "screen", this is intended to mean the most varied types of screens, filters or other retaining devices for contaminants.

The screen-changing device of the generic type does not permit back flushing of the screen, but only venting. Owing to the fact that both the channel division and the channel convergence are performed within the housing, while the screen support just has the screens arranged in it, the flow channels are difficult to access for cleaning purposes.

AT 395 825 discloses a screen-changing device of a different generic type, which does not have channel division or channel convergence with two inlet channels, and in which a back flushing of the single screen is possible from a collecting chamber, in which polymer taken from the actual melt stream is collected during the operation of the device. Such a device is not advantageous for injection-molding installations in particular, since variations in the pressure and volume of the polymer material occur and may result in malfunctions or irregular degrees of filling of the downstream injection-molding device.

The invention is based on the object of improving a device of the generic type to the extent that the back flushing and changing of a screen is possible, while at the same time avoiding entrapped air in the products of a downstream injection-molding installation.

This object on which the invention is based is achieved by a screen-changing device having the features of claim 1.

In the normal operating position, in which the plastics processing installation is ready for use, a polymer stream thus runs through one or both inlet openings of the screen support and accordingly through one or through two screens to the common outlet channel of the screen support, which is in connection with the third section of the flow channel, on the housing side.

With respect to this operating position (first position of the screen support), according to the invention the screen support is arranged such that it can be moved into a second (back-flushing) position, in which there continues to be a connection between an inlet channel of the screen support and the first section of the flow channel and polymer can flow into the screen support.

However, the outlet channel of the screen support is no longer in connection with the third section of the flow channel, but is closed off and bears, for example, against a wall of the housing, with the result that here a flow reversal of the polymer is enforced and the latter flows back through the other inlet channel, respectively, of the screen support and consequently effects a back flushing of the screen arranged in this second inlet channel. The polymer thereby flowing back can be directed by a back-flushing line in the housing to a collecting reservoir or the like.

The screen support can be moved into a third (screen-changing) position with respect to its operating position such that free access to an inlet opening, and consequently to a screen, is possible, with the result that a screen change can be performed in this position.

According to the invention, entrapped air in the plastic products produced can be avoided by initially moving the arrangement into the back-flushing position after a screen change, in which air necessarily forces its way into the flow path of the polymer, and by conveying polymer through the first inlet channel and through the second inlet channel into the back-flushing line, with the result that in this conveyance of polymer the entrapped air is also conveyed to the outside through the back-flushing line, until the entire screen-changing device no longer has any entrapped air.

In this state, the screen support can be moved out of the back-flushing position into the normal operating position, with the result that the plastics processing installation can subsequently be operated without having entrapped air in the polymer stream.

For an injection-molding installation, this means that, theoretically, the entire installation can continue to run right through the back-flushing phase or the screen-changing phase, with the effect of operating unproductively during this time, no injection moldings being produced by the so-called shots. This is not critical, in any event not in comparison with the production of injection moldings with entrapped air, which may go unnoticed. Therefore, the quality of the products of the plastics processing installation is ensured at a high level by the device according to the invention.

In a way known per se, the screen support may be designed as an elongate plunger, in which the two inlet channels are arranged one behind the other in the longitudinal direction of the plunger. In this way, it is possible to activate the three described positions of the screen-changing device by a simple translatory movement.

Pressure sensors may be provided in order to initiate an automatic movement of the screen support if a certain tolerance pressure range is exceeded, with the result that first of all an automatic back flushing of the screens in the screen support can take place and—if this does not lead to an adequate pressure reduction—signals can be sent to the operating personnel, who can then perform a screen change.

Further advantageous developments of the device according to the invention can be taken from the subclaims.

BRIEF DESCRIPTION OF THE DRAWINGS

An exemplary embodiment of a screen-changing device according to the invention is explained in more detail below with reference to the drawings, in which:

FIG. 1 shows a horizontal section through a device according to the invention in a diagrammatic representation, the device being in its operating position, FIG. 2 shows a view similar to FIG. 1, the device being in the back-flushing position, and FIG. 3 shows a view similar to FIG. 1 or 2, the device being in its screen-changing position.

DETAILED DESCRIPTION OF PREFERRED EMBODIMENTS

In FIG. 1, a screen-changing device is denoted generally by 1 and comprises a housing 2 and a screen support 3. The device 1 creates a flow path 4 for liquid polymer, the housing 2 initially forming a first section 5 of this flow path 4, the screen support 3 forming a second section 6 and the housing 2 in turn forming a third section 7 of this flow path 4.

The second section 6 has two inlet channels 8, which are brought together to form a common outlet channel 9.

In each of the inlet channels 8, a screen 10 for the polymer is provided.

FIG. 1 shows the operating position of the screen-changing device 1. In this operating position, polymer can be conveyed through the first section 5 of the flow path 4 into the two inlet channels 8 of the screen support 3, which are combined to form the outlet channel 9. From here, the polymer enters the third section 7 of the flow path 4 and passes, for example, into an injection-molding installation.

In FIG. 2, the screen support 3 has been moved out of its operating position, in that it has been displaced along its longitudinal axis. In this back-flushing position, polymer flows through the first section 5 into the left-hand inlet channel 8 and from there into the common outlet channel 9 of the screen support 3. In the back-flushing position, this outlet channel 9 has no connection with the third section 7 of the flow channel 4, but bears against the housing 2. Therefore, a flow deflection and flow reversal of the polymer takes place here. Said polymer flows back through the right-hand inlet channel and therefore flushes the screen 10 of the right-hand inlet channel 8. This right-hand inlet channel 8 is not in connection with the first section 5 of the flow path 4, but with a back-flushing line 11 of the housing 2.

When, following the back flushing of the filter 10, the screen support 3 is moved back again into the operating position according to FIG. 1, entrapped air cannot occur anywhere in the flow path 4, since air was not able to get into the flow path 4 at any time during the entire phase of the filter back flushing.

A back flushing of the left-hand filter 10 is possible by a similar displacing movement of the screen support 3, but directed to the left from the operating position, in analogy with the position according to FIG. 2.

FIG. 3 shows the screen-changing device 1 in the screen-changing position. In this screen-changing position, the screen support 3 has been moved even further out of its operating position with respect to the back-flushing position, with the result that the right-hand inlet channel 8 and the screen 10 arranged in it are freely accessible for a filter change. In such a filter change, air of course forces its way into the flow channel 4, in particular in the region of the right-hand inlet channel 8.

Therefore, the device is not moved back directly from this screen-changing position according to FIG. 3 into the operating position according to FIG. 1, but rather is initially moved just into the back-flushing position according to FIG. 2. In this back-flushing position, polymer is then conveyed in the same way as for back flushing a screen, with the result that in this way polymer is discharged, together with the entrapped air contained in it, out of the screen-changing device 1 through the back-flushing line 11. Subsequently, when there is no longer any entrapped air in the system, the screen support 3 is moved out of the back-flushing position into the operating position, with the result that then the screen-changing device is available without entrapped air after a screen change.

Not shown for reasons of overall clarity are sensors by which the degree of contamination of the screens 10 can be measured. In the simplest case, this can take place, for example, by a pressure sensor in the first section 5 of the flow path 4, an increasing pressure here indicating the increasing contamination and clogging of the screens 10. An automatic change of the screen support 3 between the operating position according to FIG. 1 and the back-flushing position according to FIG. 2 can be automatically initiated and carried out, with the result that an automatic screen back flushing can take place. For a screen change, such a sensor may be connected to a warning device, which draws the attention of operating personnel to excessive resistance of the screens 10, with the result that then the screen change can be performed manually.

By contrast with the exemplary embodiment represented, in which the different operating positions are assumed merely by a translatory movement of the screen support 3, the screen support 3 may also be designed differently, with the result that the individual positions can be assumed, for example, by rotations of the screen support. In the exemplary embodiment represented, the two inlet channels 8 and the outlet channel 9, and accordingly the first section 5 and the third section 7, may lie in a common horizontal plane, but, as a departure from this exemplary embodiment, the individual sections of the flow path may be arranged in horizontally offset planes.

We claim:

1. Screen-changing device for plastics processing installations, having a housing, and having a screen support mounted movably in the housing, the housing and the screen support jointly forming a flow path for liquid polymer, and the housing forming a first section of the flow path, which has a main inlet channel, and the housing also forming a third section of the flow path, which has an outlet channel, while the screen support forms a second, middle section of the flow path, in which two screens are arranged, and each screen can be moved by a movement of the screen support into the flow path or out of the flow path, according to choice, and the screen-changing device having a channel division of the main inlet channel into at least two inlet channels, and a channel convergence, in which the inlet channels run together to form the outlet channel, a screen being arranged in each inlet channel, and the screen support being such that it can be moved out of an operating position, in which a flow path runs from the main inlet channel and through both inlet channels to the outlet channel, into a screen-changing position, in which the screen support is arranged offset with respect to the first and third sections of the flow path and in which an inlet channel creates free access to the screen arranged in it, characterized in that the channel convergence of the inlet channels (8) is formed in the screen support (3), and in that the screen support (3) can be moved into a back-flushing position, in which the outlet channel (9) formed in the screen support (3) is arranged offset from the third section (7) of the flow path (4) in front of a wall in the back-flushing position, one inlet channel (8) being connected to the first section (5) of the flow path (4), and, in the back-flushing position, a second inlet channel (8) being connected to a back-flushing line (11) provided in the housing (2).

2. Device according to claim 1, characterized in that the screen support (3) is designed as an elongate plunger which is mounted longitudinally displaceably in the housing (2), the second section (6) of the flow path (4) running substantially transversely with respect to the longitudinal axis of the plunger.

3. Device according to claim 2, characterized in that the plunger has two inlet channels (8), which are arranged one behind the other in the longitudinal direction of the plunger.

4. Device according to claim 1, characterized in that the first section (5) is dimensioned large enough and the distance between two inlet channels (8) is dimensioned small enough that, in the operating position of the device (1), the flow path (4) runs through both inlet channels (8).

5. Device according to claim 1, characterized by sensors for determining the degree of contamination of the screens (10), the sensors being connected to a signaling device.

6. Device according to claim 1, characterized by sensors for determining the degree of contamination of the screens (10), the sensors being connected to a screen-support control system for the automatic initiation of a screen back flushing.

7. Device according to claim 5, characterized by pressure sensors which are arranged upstream of the screens (10) in the direction of flow of the polymer.

* * * * *

UNITED STATES PATENT AND TRADEMARK OFFICE
CERTIFICATE OF CORRECTION

PATENT NO. : 5,922,194

DATED : JULY 13, 1999

INVENTOR(S) : BRUCKMANN ET AL.

It is certified that error appears in the above-identified patent and that said Letters Patent is hereby corrected as shown below:

On the front page (30), at "Foreign Application Priority Data", "May 13, 1995" should read --May 31, 1995--

Signed and Sealed this

Eighth Day of May, 2001

*Attest:*

NICHOLAS P. GODICI

*Attesting Officer*     *Acting Director of the United States Patent and Trademark Office*